(12) United States Patent
Smith et al.

(10) Patent No.: US 11,369,210 B2
(45) Date of Patent: Jun. 28, 2022

(54) COLLAPSIBLE CARRY COT

(71) Applicant: Mamas & Papas Limited, Huddersfield (GB)

(72) Inventors: Peter Neil Smith, Huddersfield (GB); Graham John Martin, Huddersfield (GB)

(73) Assignee: Mamas & Papas Limited, Huddersfield (GB)

( * ) Notice: Subject to any disclaimer, the term of this patent is extended or adjusted under 35 U.S.C. 154(b) by 0 days.

(21) Appl. No.: 17/110,948

(22) Filed: Dec. 3, 2020

(65) Prior Publication Data

US 2021/0169236 A1 Jun. 10, 2021

(30) Foreign Application Priority Data

Dec. 6, 2019 (GB) .................................... 1917916

(51) Int. Cl.
*A47D 13/02* (2006.01)

(52) U.S. Cl.
CPC .................................... *A47D 13/02* (2013.01)

(58) Field of Classification Search
CPC ...... A47D 13/02; A47D 13/025; A47D 7/002; A47D 7/005; A47D 9/005
USPC ....................................................... 294/140
See application file for complete search history.

(56) References Cited

U.S. PATENT DOCUMENTS

| | | | | |
|---|---|---|---|---|
| 5,199,930 A | * | 4/1993 | Weber | A63K 3/043 108/117 |
| 5,207,333 A | * | 5/1993 | Peng | A47B 43/00 187/211 |
| 5,934,641 A | * | 8/1999 | Vince | A47D 9/02 248/431 |

(Continued)

FOREIGN PATENT DOCUMENTS

| | | |
|---|---|---|
| CN | 102018395 A | 4/2011 |
| CN | 201905579 U | 7/2011 |

(Continued)

OTHER PUBLICATIONS

GB Patents Act 1977: Search Report under Section 17, Application No. GB1917916.7, dated Jul. 9, 2020.

(Continued)

*Primary Examiner* — Paul T Chin
(74) *Attorney, Agent, or Firm* — MacMillan, Sobanski & Todd, LLC

(57) ABSTRACT

A collapsible carry cot includes a base member; first and second frame members, wherein the first and second frame members together at least partially define a side or end wall of the carry cot, and wherein the first and second frame members are pivotally coupled together such that pivoting the first and second frame members relative to one another changes a height of the side or end wall of the carry cot, and wherein the first frame member is pivotally movable relatively to the base member and the second frame member is pivotally and slidably movable relative to the base member; and a securing mechanism, the securing mechanism to (Continued)

releasable secure the second frame member relative to the base member, such that sliding of the second frame member relative to the base member is restricted, thereby restricting pivoting of the first frame member relative to the second frame member.

10 Claims, 6 Drawing Sheets

(56) References Cited

U.S. PATENT DOCUMENTS

| | | | |
|---|---|---|---|
| 9,668,600 B1* | 6/2017 | Lau | A47J 47/14 |
| 10,974,754 B2* | 4/2021 | Choi | B62B 9/14 |
| 11,085,577 B1* | 8/2021 | Wilson | B65D 25/00 |
| 2009/0193582 A1* | 8/2009 | Kummerfeld | A47D 9/02 |
| | | | 5/102 |
| 2013/0256611 A1* | 10/2013 | Ruth | B66F 7/065 |
| | | | 254/122 |
| 2015/0321891 A1* | 11/2015 | Mohr | B66F 7/065 |
| | | | 254/122 |
| 2020/0037782 A1* | 2/2020 | Malott | A47D 15/00 |
| 2021/0261183 A1* | 8/2021 | Hartenstine | B60N 2/2848 |

FOREIGN PATENT DOCUMENTS

| | | |
|---|---|---|
| CN | 102616266 A | 8/2012 |
| GB | 2533197 A | 6/2016 |
| WO | 2014071987 A1 | 5/2014 |

OTHER PUBLICATIONS

Extended European Search Report, Application No. 20211591.1, dated Mar. 18, 2021.

* cited by examiner

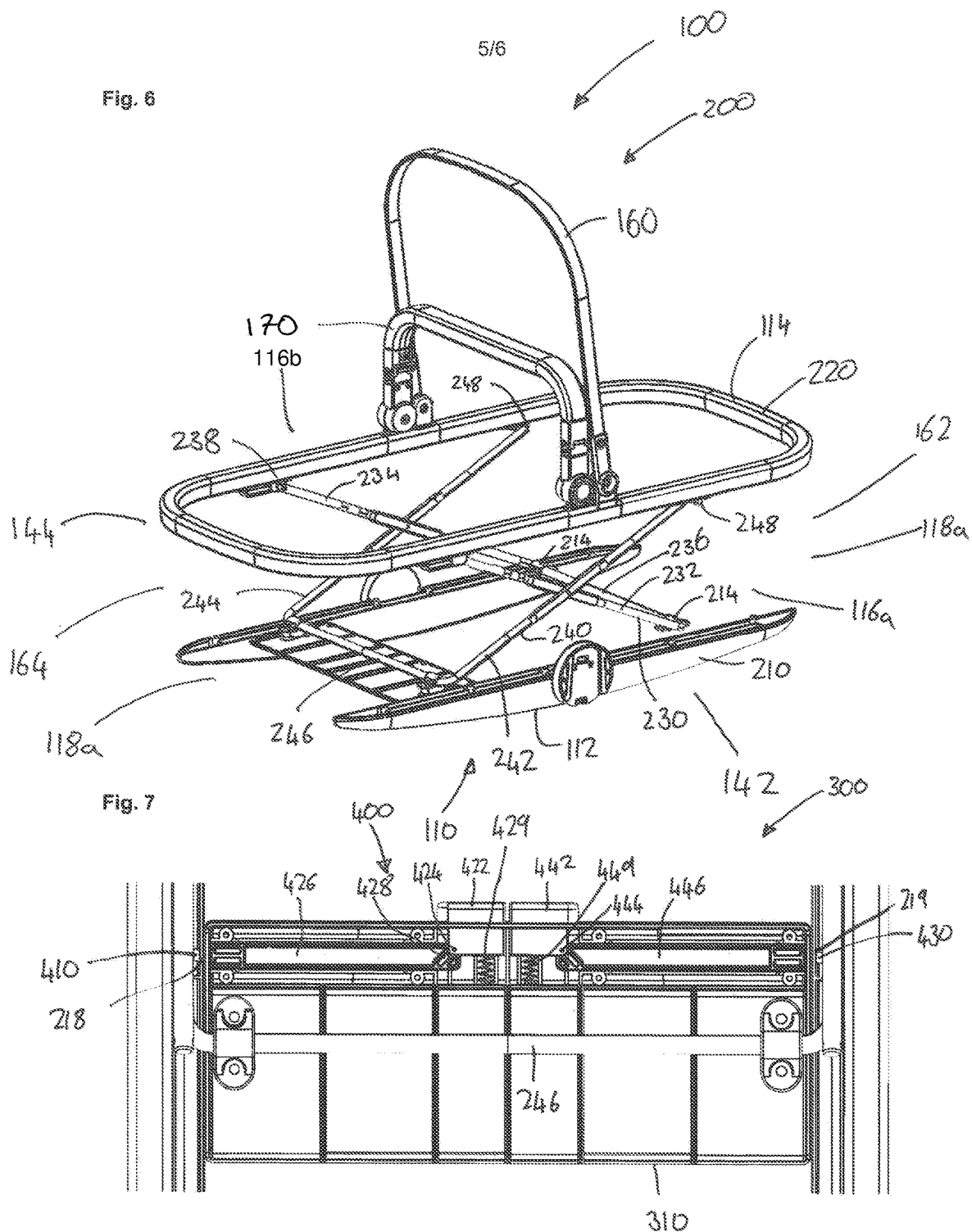

COLLAPSIBLE CARRY COT

BACKGROUND OF THE INVENTION

The present disclosure relates to collapsible carry cots.

Pushchairs for transporting infants can often be fitted with a carry cot that provides a flat bed for the infant to lie on whilst being transported by the pushchair. Carry cots are particularly beneficial for transporting younger infants who are not able to sit up safely and comfortably for the duration of a journey in the pushchair.

The carry cot may be detachable from the pushchair chassis. For example, the carry cot may be detached from the pushchair chassis in order to facilitate transporting the pushchair, e.g. in a luggage compartment of a vehicle, or to store the carry cot and/or pushchair between uses.

On some journeys in the pushchair, and when the infant reaches a particular age, weight and/or height, it may be desirable for the infant to be seated in a more upright position. In such circumstances, the carry cot may be detached from the pushchair chassis and replaced with a seat for the pushchair that allows the infant to be positioned in a more upright seating position.

When the carry cot, is detached from the pushchair and not in use, it is desirable for the carry cot to be convenient to store, e.g. within a luggage compartment of a vehicle or other storage area, until the next time the carry cot is used.

SUMMARY OF THE INVENTION

According to an aspect of the present disclosure, there is provided a collapsible carry cot comprising:

a base member;

first and second frame members, wherein the first and second frame members together at least partially define a side and/or end wall of the carry cot, and wherein the first and second frame members are pivotally coupled together such that pivoting the first and second frame members relative to one another changes a height of the side and/or end wall of the carry cot, for example, the first and second frame member may be coupled together to form a scissor linkage, wherein the first frame member, e.g. a first end of the first frame member, is pivotally movable relative to the base member, for example a first end of the first frame member may be pivotally coupled to the base member, and the second frame member, e.g. a first end of the second frame member is pivotally and slide ably movable relative to the base member, for example a first end of the second frame member may be supported relative to the base member, such that the second frame member is pivotally and slide ably movable relative to the base member at the first end; and a securing mechanism, the securing mechanism to releasably secure the second frame member relative to the base member, such that sliding of the second frame member relative to the base member is restricted, thereby restricting pivoting of the first frame member relative to the second frame member.

The first frame member may be pivotable relative to the base member, e.g. about the first end of the first frame member, about a first lateral axis of the carry cot. The second frame member may be pivotable relative to the base member, e.g. about the first end of the second frame member, about a second lateral axis of the carry cot. The second frame member may be slidable relative to the base member in a longitudinal direction of the carry cot.

The first and second lateral axis of the carry cot may be spaced apart from each other in a longitudinal direction of the carry cot. Sliding of the second frame member relative to the base member may adjust the spacing of the first and second lateral axes in the longitudinal direction of the carry cot.

The first and second frame members may be pivotally coupled together at a position between the first and second ends of the first frame member and/or at a position between the first and second ends of the second frame member.

The base member may define a bottom of a bed portion of the carry cot. The carry cot may further comprise an upper member. The upper member may at least partially define a top of the bed portion. The side and end walls of the carry cot may extend between the base member and the upper member. The side and end walls may be walls of the bed portion. An internal space of the bed portion may be defined by the base member, the upper member and the side and end walls. The upper member may form a rim of an opening into an internal space within the bed portion of the carry cot such that an infant may be placed into the carry cot through the opening.

The second frame member may be pivotally coupled to the upper member at the second end of the second frame member. The second end of the first frame member may be coupled to the upper member such that the second end of the first frame member is pivotally and slide ably movable relative to the upper member.

The securing mechanism may comprise a body portion slidable relative to the base member, e.g. in the longitudinal direction of the carry cot, and a securing portion for securing the position of the body portion relative to the base member. The body portion may be slidably coupled to the base member.

The securing mechanism may be configured such that the body portion slides together with the first end of the second frame member relative to the base member. The second frame member may be supported relative to the body portion, such that the second frame member is restricted from sliding relative to the body portion. Securing the position of the body portion relative to the base member may restrict sliding of the first end of the second frame member relative to the base member.

The second frame member may be pivotally coupled to the body of the securing mechanism, e.g. at the first end of the second frame member. The second frame member may be pivotally coupled to the body of the securing mechanism and the base member about the same axis.

The securing portion may comprise an engagement element for selectively engaging the base member in order to secure the body of the securing mechanism relative to the base member.

The engagement element may be movable relative to the base member, e.g. to engage or disengage from the base member, in a direction with a component in a lateral direction of the folding carry cot.

The base member may comprise an opening to receive the engagement element at a position on the base member that is aligned with the engagement element, e.g. in the longitudinal direction of the carry cot, when the first and second frame members are arranged such that a height of the side or end wall of the carry cot is at a predetermined height, e.g. a maximum desirable height. The engagement element may be configured to engage the base member at the opening, e.g. to secure the body relative to the base member.

The securing mechanism may comprise a switch, actuatable by a user, and an engagement mechanism for moving the engagement element to disengage from or engage the base member when the switch is actuated. The term switch is used in the present specification to mean any user actuatable element, such as a button, lever or handle, that can be pushed, pulled, twisted, rotated, slid or moved by a user in any other way in order to actuate the switch. The switch may be actuatable in a first direction to move the engagement element to disengage from the base member and may be actuatable in a second direction (opposite to the first direction) to move the engagement element to engage the base member.

The engagement mechanism may comprise a link member coupled to the engagement element. A cam surface may be formed on the link member. The switch may comprise a follower element which engages the cam surface. The cam surface and follower element may together guide the movement of the link member to move the engagement element when the switch is actuated.

In particular, actuating the switch may cause the follower element to travel along the cam surface and the follower element may act against the cam surface, under the force by which the switch is activated, to move the link member, which may in turn move the engaging member.

The cam surface may be angled such that the action of the follower along the cam surface acts to move the link member in a direction that is angled, e.g. at a right angle, relative to the direction in which the switch is actuated.

The switch may be actuatable in a longitudinal direction of the carry cot. The engagement mechanism may cause the engagement element to be moved in a lateral direction of the carry cot when the switch is actuated.

The engagement element may be biased into a position in which the engagement element engages the base member. For example, a biasing element, e.g. a resilient element, such as a spring, may be provided as part of the engagement mechanism, e.g. arranged to act against the switch, link member or engagement element.

The securing portion may further comprise a further engagement element to selectively engage the base member of the carry cot in order to secure the body of the securing mechanism relative to the base member. The further engagement element may be actuated independently of the engagement element to engage and disengage from the base member. For example, the securing portion may further comprise a further switch to be actuated by a user and a further engagement mechanism for moving the further engagement element to disengage from and engage the base member when the further switched is actuated by the user.

The engagement mechanism and further engagement mechanism may be configured such that the switch and further switch are actuatable in the same direction as one another, in order to disengage the engagement element and further engagement element from the base member respectively. The engagement mechanism and further engagement mechanism may be configured such that the engagement element and further engagement element move in different, e.g. opposite, directions from one another to engage and disengage from the base member.

According to another aspect of the present disclosure, there is provided a collapsible carry cot comprising:
 a base member;
 a first frame member, the first frame member having a first end base member and a second end;
 a second frame member, the second frame member having a first end and a second end, wherein the second frame member is pivotally coupled, at a position between the first and second ends of the second frame member, to the first frame member, at a position between the first and second ends of the second frame member,
 wherein the first and second frame members together define a side wall of the carry cot, wherein the first and second frame member are coupled together such that pivoting the first and second frame members relative to one another changes a height of the side wall of the carry cot; and
 a securing mechanism, the securing mechanism to releasable lock the first frame member and/or the second frame member relative to the base member, such that the first end of the first and/or second frame member is prevented from sliding relative to the base member.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention. For example, features described in relation to the first mentioned aspect may be combined with the features of the second mentioned aspect.

Various aspects of this invention will become apparent to those skilled in the art from the following detailed description of the preferred embodiment, when read in light of the accompanying drawings.

BRIEF DESCRIPTION OF THE DRAWINGS

FIG. 6 is a perspective view of a collapsible carry cot, according another arrangement of the disclosure, in which coverings of the collapsible carry cot are omitted for clarity.

FIG. 7 is a top view showing the engagement mechanisms for the securing portion of the collapsible carry cot according to another arrangements of the disclosure.

DETAILED DESCRIPTION OF THE PREFERRED EMBODIMENT

Figure 1:
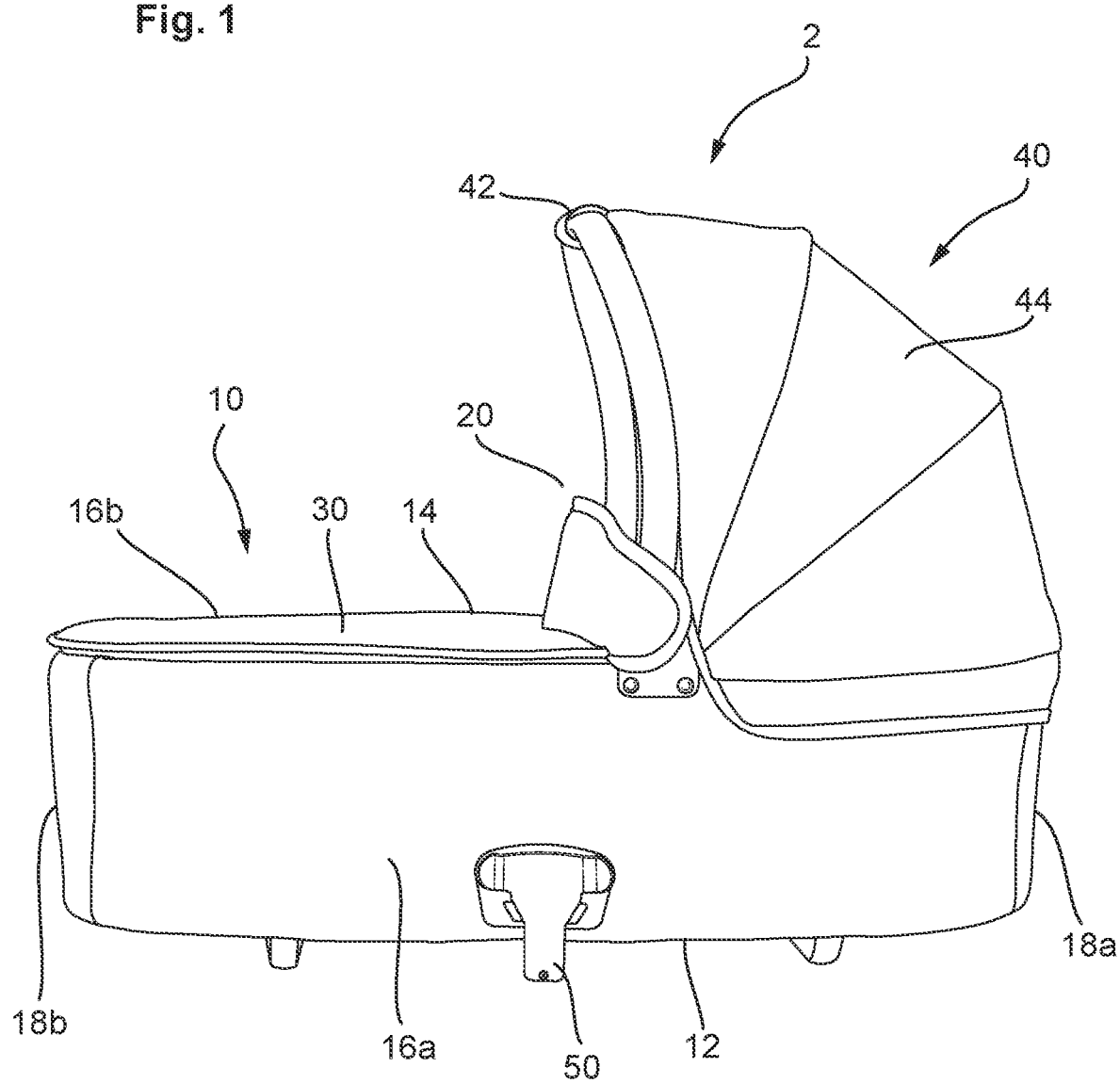
FIG. 1 is a side view of a previously proposed carry cot.

With reference to FIG. 1, a previously proposed carry cot 2 comprises a bed portion 10 having a base 12, a top 14, first and second side walls 16a, 16b and first and second end walls 18a, 18b that together define an internal space of the bed portion. A mattress (not shown) may be provided on the base 12 within the internal space of the bed portion. In use of the carry cot 2, an infant may be laid on the mattress with their head at or towards one of the end walls, such as the first end wall 18a, and their feet towards the other of the end walls, e.g. the second end wall 18b.

Within the present specification a longitudinal direction of the carrycot is defined as a direction extending between the ends of the carry cot, e.g. between the first end wall, at which an infant's head may be arranged in use of the carry cot, and the second end wall 18b, towards which the infant's feet may be arranged in use of the carry cot. A lateral direction of the carry cot is defined as a direction perpendicular to the longitudinal direction and a vertical direction, e.g. between the side walls of the carry cot.

The side and end walls 16a, 16b, 18a, 18b of the carry cot may comprise one or more layers of material, e.g. fabric and/or cushioning, extending between the base 12 and the top 14. An opening 20 into the internal space of the bed portion 10 may be formed at the top 14 of the bed portion 10 to enable the infant to be placed into the internal space.

As shown in FIG. 1 the opening 20 may be at least partially closed by a cover 30, such as a material, e.g. fabric, cover. The cover 30 may be detachable and/or removable, and in some arrangements maybe omitted.

The carry cot 2 may further comprise a hood 40. The hood 40 may comprise a hood support bar 42 coupled to the bed portion 10 and a canopy 44, e.g. formed from one or more lays of materials, e.g. fabrics, supported by the hood support bar 42. The canopy may extend from the hood support bar 42 to one of the end walls 18a, 18b of the bed portion 10, so that the hood canopy can extend over a portion of the opening 20, e.g. a portion not covered by the cover 30, in order to shelter the infant from sunlight, rain and other weather. The hood 40 may further comprise one or more intermediate support members for supporting the canopy 44 between the hood support bar 42 and the end wall 18a, 18b of the bed portion. The hood support bar 42 may be pivotally movable relative to the bed portion 10, in order to adjust the extent to which the hood covers the opening 20.

The carry cot 2 may further comprise a pushchair fixing 50 on either lateral side of the carry cot 2 for attaching the carry cot 2 to the chassis of a pushchair (not shown).

The carry cot 2 further comprises a ridged support frame, not visible in FIG. 1, comprising one or more frame members, which rigidly support the shape of the bed portion 10. In particular, the ridged support frame may rigidly support the top 14, first and second side walls 16a, 16b and first and second end walls 18a, 18b relative to the base 12 and the pushchair fixings 50. The ridged support frame may further support the hood 40, e.g. the hood support bar 42, relative to the base 12 and the pushchair fixings 50.

Figure 2:
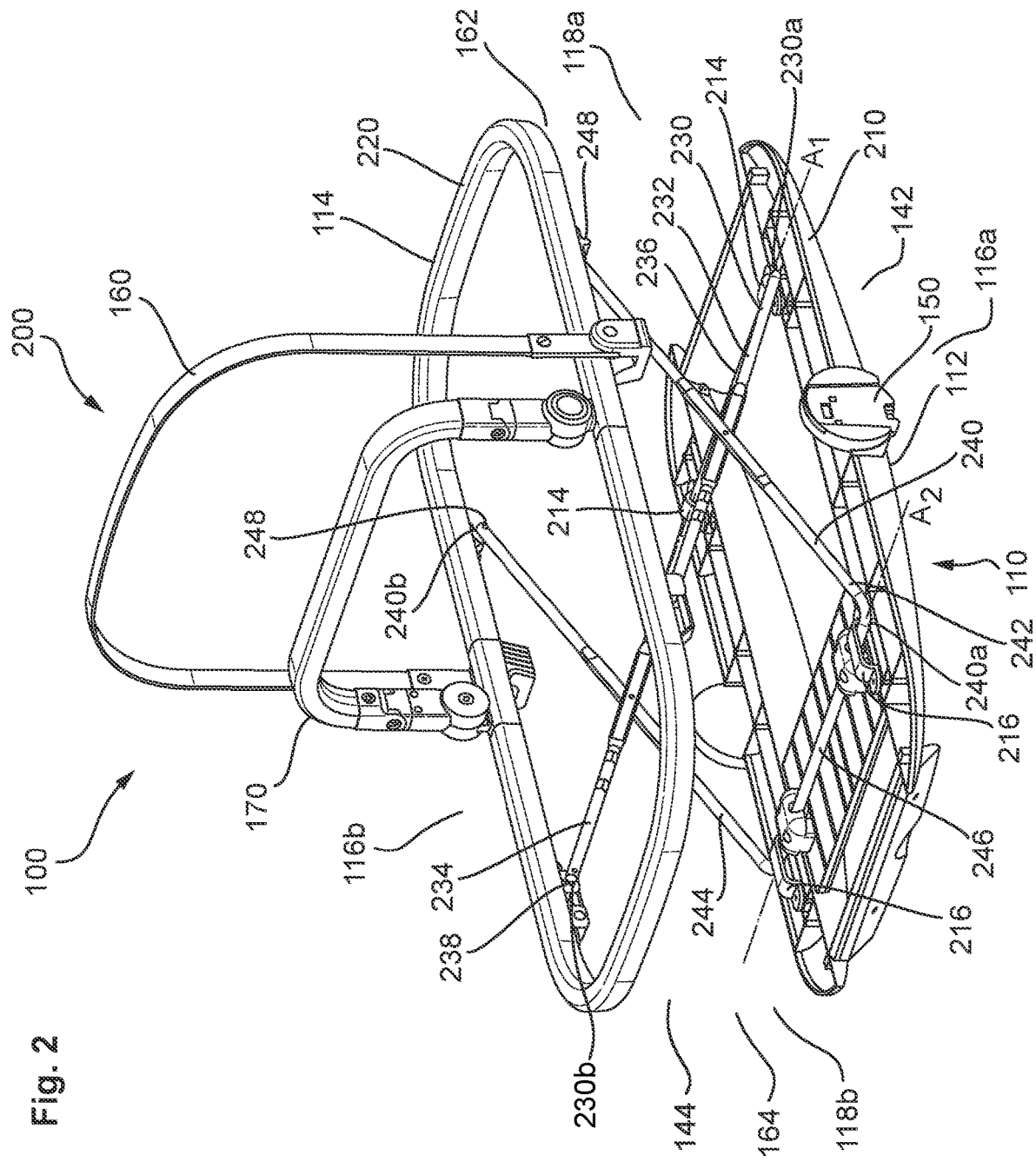
FIG. 2 is a perspective view of a collapsible carry cot, according to the present disclosure, in which coverings of the collapsible carry cot are omitted for clarity.

A carry cot 100 according to the present disclosure, will now be described with reference to FIG. 2. In FIG. 2, material coverings and cushioning are omitted for clarity, so that a support frame 200 of the carry cot 100 is visible. The canopy of the hood is also omitted.

The carry cot 100 is similar to the carry cot 2 and comprises a bed portion 110 having a base 112, a top 114, first and second lateral sides 142, 144 and first and second longitudinal ends 162, 164.

The support frame 200 comprises a base member 210, which at least partially forms the base 112 of the carry cot, and an upper member 220, which at least partially forms the top 120 of the carry cot, e.g. the bed portion of the carry cot. The support frame further comprises a first frame member 230 and a second frame member 240. The first and second frame members 230, 240 extend between the base member 210 and the upper member 220, and at least partially form first and second laterally opposing side walls 116a, 116b of the carry cot 100 at the first and second sides 142, 144 respectively.

The carry cot 100 may further comprise pushchair fixing 150 for coupling the carry cot 100 to the chassis of a push chair (not shown). As depicted, the pushchair fixings 150 may be coupled to or integrally formed with the base member 210.

The carry cot 100 may further comprise a hood support bar 160, pivotally coupled to the frame 200, e.g. to the upper member 220. The hood support bar 160 may be similar to the hood support bar 42 described above with reference to FIG. 1.

The carry cot 100 may further comprise a carry handle 170. As depicted, the carry handle 170 may be coupled to the frame 200, e.g. to the upper member 220, at the lateral sides of the carry cot.

The first and second frame members 230, 240 comprise respective first ends 230a, 240a and second ends 230b, 240b. The first ends 230a, 240a of the first and second frame members are coupled to the base member. Second ends 230b, 240b of the first and second frame members may be coupled to the upper member 220.

As depicted, the first frame member 230 comprises a first side wall portion 232. The first side wall portion 232 is arranged to extend from the first end 230a of the first frame member to the second end 230b of the first frame member at the first lateral side 142 of the carry cot, in order to partially form the first side wall 116a of the carry cot. As depicted, the first side wall portion 232 may extend in a direction with component in longitudinal and vertical directions of the carry cot 100.

The first frame member 230 further comprises a second side wall portion 234. The second side wall portion 234 is arranged to extend from the first end 230a of the first frame member to the second end 230b of the first frame member at the second lateral side 144 of the carry cot, in order to partially form the second side wall 116b of the carry cot. As depicted, the second side wall portion 234 may extend in a direction parallel with the first side wall portion.

The first frame member 230 further comprises a laterally extending portion 236 extending laterally between the first a second side wall portions 232, 242. As shown, the laterally extending portion 236 may extend between the first and second side wall portions 232 at the first end 230a of the first frame member 230.

The laterally extending portion 236 may be substantially cylindrical and may form a pivot pin of the first frame member 230 to facilitate pivoting of the first frame member 230 relative to the base member 210, as described below.

In the arrangement shown, the first side wall portion 232, second side wall portion 234 and laterally extending portion 236 are formed as one piece. However, in other arrangements, the first side wall portion 232 and the second side wall portion 234 may be separate components from one another. In such arrangements, each of the first and second side wall portion 234 may comprise a laterally extending portion that extends partially across the lateral width of the carry cot at the first end 230a, e.g. to act as pivots for the first and second side wall portion. Alternatively, the first and second side wall portions 232, 234 may comprise another structure to facilitate pivoting of the first and second side wall portions 232, 234 relative to the base member 210 at the first end 230a.

The second frame member 240 is similar to the first frame member 230 and comprises a first side wall portion 242, arranged to partially form the first side wall 116a of the carry cot, a second side wall portion 242, arranged to partially form the second side wall 116b of the carry cot, and a laterally extending portion 246, extending laterally between the first and second side wall portions of the second frame member 240 at the second end 240b of the second frame member 240.

The laterally extending portion 246 of the second frame member may be substantially cylindrical and may form a pivot pin of the second frame member 240 to facilitate pivoting of the second frame member relative to the base member 210, as described below.

Although in the arrangement shown, the first side wall portion 242, second side wall portion 244 and laterally extending portion 246 are formed as one piece, in other arrangements, the first side wall portion 242 and the second side wall portion 244 may be separate components from one another. In such arrangements, each of the first and second side wall portion 242, 244 may comprise a laterally extending portion that extends partially across the lateral width of the carry cot at the first end 240a, or another structure to facilitate pivoting of the first and second side wall portions 242, 244 relative to the base member 210 at the first end 240a.

The first and second frame members 230, 240 may be pivotally coupled to one another, e.g. at positions on the first and second frame members between their respective first and second ends 230a, 240a, 230b, 240b. In particular, the first side wall portion of the first frame member may be pivotally coupled to the first side wall portion of the second frame member and the second side wall portion of the first frame member may be pivotally coupled to the second side wall portion of the second frame member. The first and second frame members may form a scissor linkage, e.g. at one or both of the lateral sides of the carry cot.

Due to the first and second side wall portions 232, 234 of the first frame member 230 being linked by the laterally extending portion 236 of the first frame member, and the first and second side wall portions 242, 244 of the second frame member 240 being linked by the laterally extending portion 246 of the first frame member, the scissor linkages formed at the first and second lateral sides 142, 144 of the carry cot may pivot together.

The upper member 220 may be supported relative to the base member 210 by the first and second frame members 230, 240, e.g. by the scissor linkage(s) formed by the first and second frame members 230, 240. The carry cot 100 may thereby be configured such that pivoting the first and second frame members 230, 240 relative to one another changes a distance between the base member 210 and the upper member 220, thereby adjusting a height of the bed portion 110 of the carry cot 100, e.g. of the side and/or end walls.

Although not shown in FIG. 2, it will be appreciated that the side and end walls of the carry cot 100, e.g. the bed portion, are additionally formed by one or more layers of material, e.g. fabric, extending between the upper member 220 and the base member 210. The material may be arranged in a similar way to the material shown forming the side and end walls of the carry cot 2 shown in FIG. 1. In some arrangements, a first layer of material may be provided between the upper member and the base member outside of the first and second frame members, e.g. relative to the internal space of the bed portion 110 and a second layer of material may be provided between the upper member and the base member inside of the first and second frame members. Cushioning may be provided between the layers of material.

In FIG. 2, the carry cot 100 is shown in a deployed configuration in which the upper member 220 is at a maximum desirable height relative to the base member 210. In this arrangements, the side and/or end walls 116a, 116b, 118a, 118b of the carry cot have a predetermine height, e.g. the maximum desirable height. The maximum desirable height may be selected based on standards set for the depth of walls of a carry cot for an infant and/or ergonomic considerations for parents or caregivers placing the infant into and lifting the infant out of the carry cot 100.

By operating the scissor linkages formed by the first and second frame members, the height of the upper member 220 relative to the base member 210 may be adjusted, e.g. reduced, to a collapsed configuration of the carry cot in which the height of the carry cot 100, e.g. the side walls and/or end walls of the carry cot, is reduced. The carry cot 100 may therefore be referred to as a collapsible carry cot. The carry cot may be collapsed into the collapsed configuration in order to store the carry cot. Storing the carry cot 100 in the collapsed configuration may allow the carry cot to be stored in a smaller space than in the deployed configuration.

As depicted in FIG. 2, the first frame member 230 is coupled to the base member 210, at the first end 230a, such that the first frame member 230 can pivot relative to the base member 210 about the first end 230a. As shown, the first frame member is arranged to pivot about a first axis $A_1$ extending in a lateral direction of the carry cot.

The second frame member 240 may also be coupled to, or otherwise supported relative to the base member 210 at its first end 240a, such that the second frame member 240 can pivot relative to the base member about its first end. As shown, the second frame member 240 is arranged to pivot about a second axis $A_2$ extending in a lateral direction of the carry cot. The second axis $A_2$ is spaced apart from the first axis $A_1$ in the longitudinal direction of the carry cot. In order to permit the first and second frame members to pivot relative to one another, the second frame member 240 is coupled to the base member 210 such that the first end of the second frame member can also slide relative to the base member 210. In the arrangement shown in FIG. 2, the second frame member is coupled to the base member such that the first end of the second frame member can slide in a longitudinal direction relative to the base member.

The base member 210 may comprise a body portion 212, and first brackets 214 and second brackets 216 coupled to the body portion. As depicted, the first brackets 214 are for coupling the first frame member 230 to the body portion 212 at the first end 230a of the first frame member 230. The first brackets 214 may be provided at first and second lateral sides of the base member 210 in order to support the first frame member 230 relative to the base member 210 across a width of the carry cot.

The first brackets 214 are configured such that, when the first brackets 214 are coupled to the body portion 212, a space is formed between each of the first brackets 214 and the body portion within which the laterally extending portion of the first frame member 230 can be received in order to couple the first frame member 230 to the base member. As described above, the laterally extending portion 236 is cylindrical, and hence, the laterally extending portion 236 can form a pivot pin that rotates within the space formed between the first brackets and the base member to permit the first frame member 230 to pivot relative to the base member 210 about the first end 230a.

The second brackets 216 are for coupling the second frame member 240 to the body portion 212. The second brackets 216 may be provided at the first and second lateral sides of the base member in order to support the second frame member 240 relative to the base member 210 across a width of the carry cot.

As depicted, the second brackets are configured such that, when the second brackets 216 are coupled to the body portion 212, a space is formed between each of the second brackets and the body portion having a height approximately equal to a diameter of the laterally extending portion of the second frame member and a width, arranged in a longitudinal direction of the carry cot, that is greater than the diameter of the laterally extending portion 246. The laterally extending portion 246 of the second frame member can be received, within the space in order to couple the second frame member to the base member. As described above, the laterally extending portion 246 is cylindrical and can form a pivot pin that can rotate within the spaces formed between the second brackets and the base member to permit the second frame member 240 to pivot relative to the base member 210 about the first end 240a. Additionally, due to the width of the space being greater than the diameter of the laterally extending portion 246, the laterally extending portion can slide relative to the base member within the space formed between the second bracket 216 and the body portion 212. The extent to which the second frame member can slide relative to the base member may be determined by the width of the space, in the longitudinal direction of the carry cot.

In other arrangements, the first and second frame members may be coupled to the base member in any other way, such that the first member is able to pivot relative to the base member and the second frame member is able to pivot and slide relative to the base member. For example, as shown in FIG. 6, in some arrangements, the second brackets 216 may be omitted. In such arrangements, and the second frame member may be supported relative to the base member by virtue of its coupling with the securing mechanism, as described below.

When the first and second side wall portions of the first and/or second frame members are separate components, each of the first and second side wall portions may be coupled to the body portion 212 to allow the first and second side wall portions to pivot and slide relative to the base member at the first ends 230a, 240b in the same way as described above.

Returning to FIG. 2, the first frame member 230, e.g. the first and second side wall portions 232, 234, may be coupled to the upper member 220, at the second end 230b of the first frame member, such that the first frame member is slidably and pivotally movable relative to the upper member 220 at the second end of the first frame member. As depicted, pivot pins 238 may be pivotally coupled to the first frame member at the second end 230b, e.g. one pivot pin 238 on each of the first and second side wall portions, and the pivot pins may be slidably coupled to the upper member 220.

The second frame member 240, e.g. the first and second side wall portion 242, 244, may be pivotally coupled to the upper member 220 at the second end of the second frame member. For example, pivot pins 248 may be pivotally coupled to the second frame member at the second end 240b, e.g. one pivot pin 248 on each of the first and second side wall portions, and the pivot pins 248 may be pivotally coupled to the upper member 220.

The collapsible carry cot 100 further comprises a securing mechanism 300 for securing the position of the upper member 220 relative to the base member 210. The securing mechanism may be configured to secure the position of the upper member 220 in one or more positions, such as a first position corresponding to the deployed configuration of the collapsible carry cot and, optionally, a second position corresponding to the collapsed configuration of the collapsible carry cot. In some arrangements, the securing mechanism 300 may be configured to secure the upper member in one or more intermediate positions between the first and second positions.

In the arrangement shown in FIGS. 2 to 5, the securing mechanism 300 is configured to secure the position of the upper member 220 relative to the base member 210 by securing the position of the first end 240a of the second frame member 240 relative to the base member 210, e.g. to restrict sliding of the first end of the second frame member relative to the base member, thereby restricting pivoting of the first and second frame members relative to one another.

Figure 3:
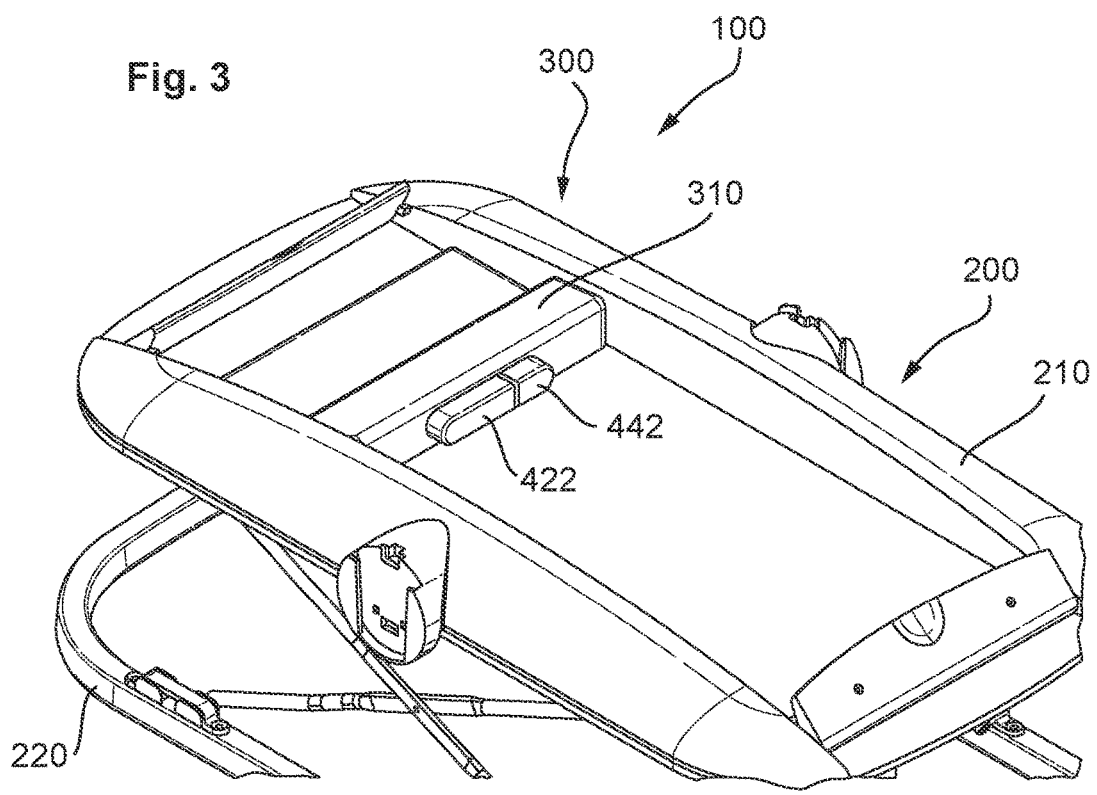
FIG. 3 is a perspective view of the collapsible carry cot shown in FIG. 2, illustrating the base of the carry cot.
Figure 4:
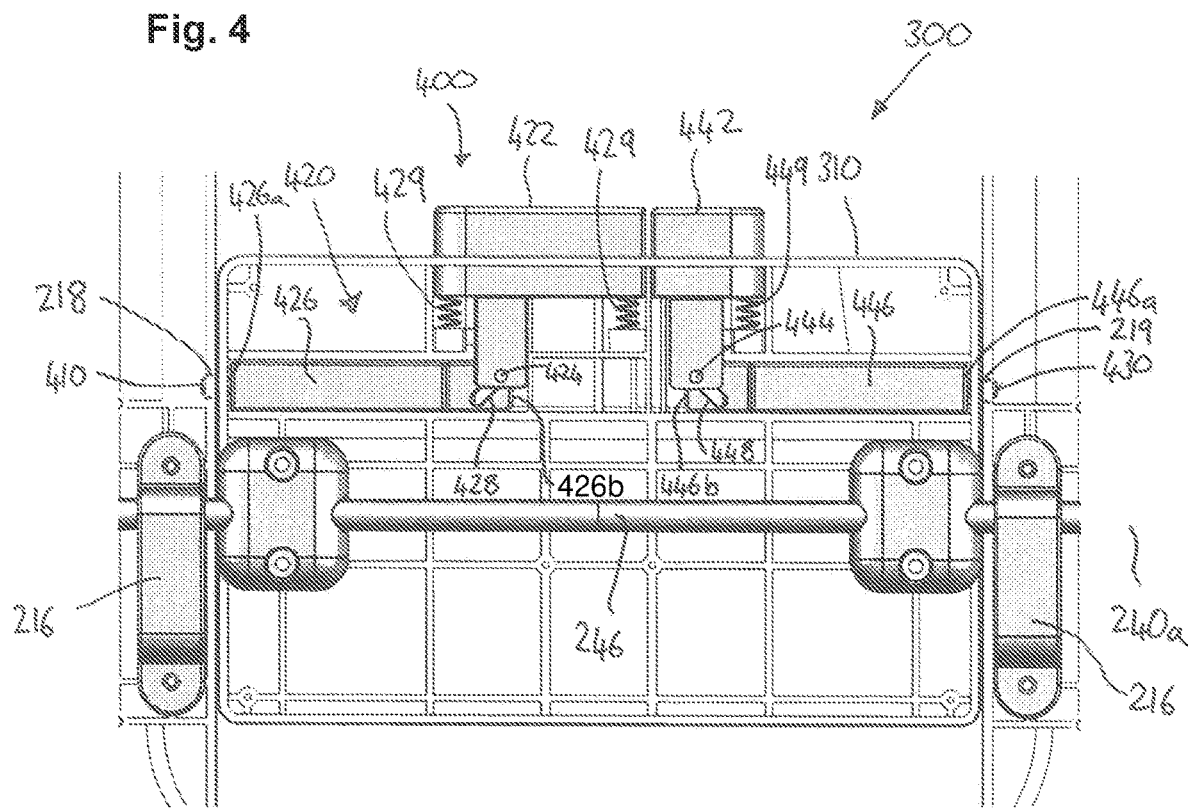
FIG. 4 is a top view showing the engagement mechanisms for the securing portion of the collapsible carry cot shown in FIGS. 1 and 2.

With reference to FIGS. 3 and 4, the securing mechanism 300 comprises a body 310. The body 310 is movable, e.g. slidable, relative to the base member 210, e.g. in a longitudinal direction of the carry cot 100. The body 310 may be slidably coupled to the base member 210. The securing mechanism 300 further comprises a securing portion 400 for securing the position of the body 310 relative to the base member, to restrict sliding of the body 310 relative to the base member 210.

The body 310 of the securing mechanism and the second frame member 240, e.g. the first end 240a of the second frame member, may be configured to side together relative to the base member 210. For example, the second frame member 240 may be pivotally coupled to the body 310 of the securing mechanism at the first end 240a of the second frame member. Securing the body 310 relative to the base member 210 may thereby restrict sliding of the first end 240a of the second frame member relative to the base member, thereby restricting pivoting of the second frame member 240 relative to the first frame member 230.

The securing portion 400 comprises an engagement element 410 and an engagement mechanism 420. The engagement element 410 is to selectively engage the base member of the frame 200 in order to secure the body 310 of the securing mechanism relative to the base member 210. The body 310 may form a housing in which the engagement mechanism 420 is housed. The engagement mechanism 420 is configured to move the engagement element 410, e.g. in a lateral direction of the carry cot, to selectively engage and disengage from the base member 210.

The base member 210 may comprise a complementary engagement feature 218, such as an opening. The complementary engagement feature 218 may be configured to engage with the engagement element 410 of the securing mechanism. For example, the complementary engagement feature 218 may be configure to at least partially receive the engagement element. The complementary engagement feature may be arranged such that the engagement feature is aligned with, and may engage with, the complimentary engagement feature when the body 310 is in the position relative to the base member 210 corresponding to the deployed configuration of the carry cot 100, so that the securing mechanism can act to secure the position of the body 310 when the first and second frame members 230, 240 are arranged such that the side and/or end walls of the carry cot are at the maximum desirable height.

In some arrangements, additional complementary engagement features (not shown) may be provided on the base member 210 so that the engagement element 410 can engage the base member in one or more additional positions, e.g. corresponding to the collapsed position and/or an intermediate position. However in the arrangement depicted, no additional complementary engagement features are provided.

The engagement mechanism 420 comprises a user actuatable switch 422. As depicted, the switch 422 is slidably mounted on the body of the securing mechanism and can be moved by a user relative to the body in order to operate the engagement mechanism 420. In the arrangement shown, the switch 422 comprises a button slidably received in an opening formed in the body. The button can be depressed into or retracted from the opening, in order to operate the engagement mechanism 420. In other arrangements, the switch 422 may comprise any other user actuatable element, which can be pushed, pulled, pivoted, twisted or slid or moved by the user in any other way order to actuate the switch 422.

As depicted, the switch 422 is slidable in a longitudinal direction of the carry cot. However, in other arrangements, the switch 422 may be slidable in another direction, e.g. having components in a lateral or vertical direction.

The engagement mechanism 420 further comprises a link member 426. The link member 426 is coupled to the engagement element 410 at a first end 426a of the link member 426. The link member 426 comprises a cam surface 428, such as a cam slot, formed on the link member at or close to a second end 426b of the link member. A follower element 424 for following the cam surface 428 on the link member is formed on the user actuatable switch 422. As depicted, the follower element 424 may be received within the cam slot.

The engagement mechanism 420 is configured such that, when the switch 422 is actuated in a first direction, e.g. depressed, by the user, the follower element 424 is moved along the cam surface 428. The link member 426 is constrained to move in a second direction. The second direction may be at an angle, e.g. a non-zero angle, relative to the first direction. For example, the first direction may be a longitudinal direction of the carry cot and the second direction may be a lateral direction of the carry cot. The cam surface is inclined relative to the first and second directions, and hence, as the follower element 424 moves along the cam surface 428, the link member 426 is caused to move in the second direction. The link member 426 in turn moves the engagement element 410 to be disengaged from the base member 210.

When the switch 422 is actuated in a direction opposite to the first direction, the follower element 424 moves back along the cam surface 428 causing the link member 426 to be moved in a direction opposite to the second direction, which moves the engagement element to engage the base member. The engagement mechanism may be biased in a direction in which the engagement element engages the base member. For example, the engagement mechanism may comprise a resilient element 429, such as a coil spring, which biases the switch 422 in the direction opposite to the first direction.

Actuating the switch 422 can thereby cause the securing mechanism 300 to be released, in order to permit sliding of the first end of the second frame member 240 relative to the base member 210.

As shown in FIG. 4, the securing portion 400 may comprise a further engagement element 430 and a further engagement mechanism 440 for selectively moving the further engagement element 430 to engage and disengage from the base member independently of the engagement element 410 and engagement mechanism 420. As shown, the further engagement mechanism 440 may comprise a further user actuatable switch 442 and a further link member 444. The further switch 442 and the further link member 444 may be configured in a similar way to the switch 422 and link member 426, as described above, such that actuating the further switch 442 operates the further engagement mechanism 440 to move the further engagement element 430 to engage and disengage from the base member 210.

Figure 5:
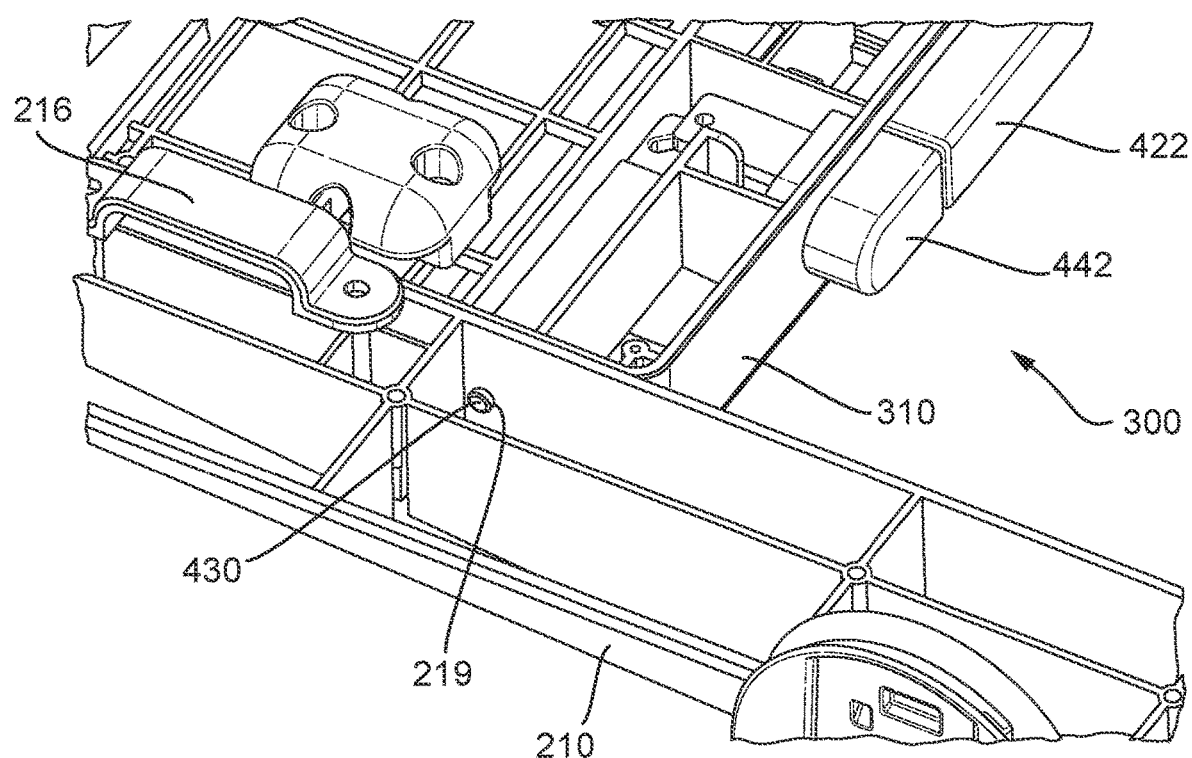
FIG. 5 is a perspective view showing part of the engagement mechanisms shown in FIG. 4 engaging with the base member of the carry cot.

As shown in FIG. 5, the base member 210 may comprise a further complementary engagement feature 219 configured to engage with, e.g. receive, the further engagement element 430 of the further securing mechanism.

Returning the FIG. 4, the further engagement mechanism 440 may comprise a further resilient element 449 to bias the further engagement mechanism 440 in a direction in which the further engagement element engages the base member 210.

As depicted, the further engagement element 430 and further engagement mechanism 440 may be formed as a mirror image of the engagement element 410 and the engagement mechanism 420 about a longitudinal centerline of the carry cot.

Figure 8:
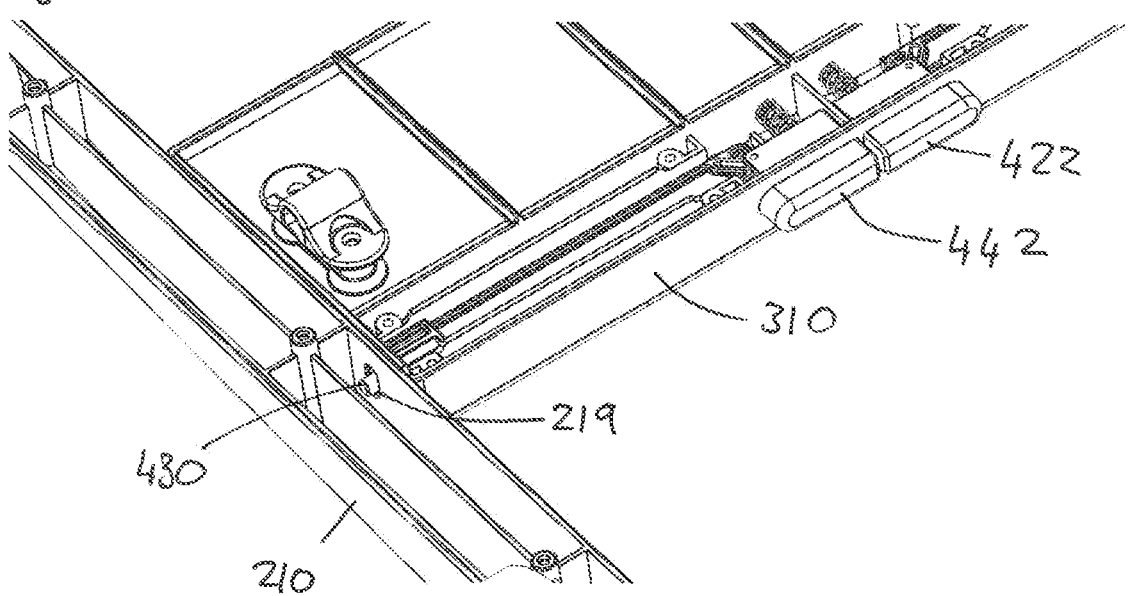
FIG. 8 is a perspective view showing part of the engagement mechanisms shown in FIG. 7 engaging with the base member of the carry cot.

FIGS. 7 and 8 show another arrangement of the securing mechanism.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A collapsible carry cot comprising:
   a base member;
   first and second frame members, wherein the first and second frame members together at least partially define a side or end wall of the carry cot, and wherein the first and second frame members are pivotally coupled together such that pivoting the first and second frame members relative to one another changes a height of the side or end wall of the carry cot, and wherein the first frame member is pivotally movable relative to the base member and the second frame member is pivotally and slidably movable relative to the base member; and
   a securing mechanism, the securing mechanism to releasably secure the second frame member relative to the base member such that sliding of the second frame member relative to the base member is restricted, thereby restricting pivoting of the first frame member relative to the second frame member; wherein:
   the securing mechanism comprises a body portion slidable relative to the base member and a securing portion for securing the position of the body portion relative to the base member;
   the securing portion comprises an engagement element for selectively engaging the base member in order to secure the body of the securing mechanism relative to the base member;
   the securing mechanism comprises a switch actuatable by a user and an engagement mechanism for moving the engagement element to disengage from or engage the base member when the switch is actuated; and
   the engagement mechanism comprises a link member coupled to the engagement element, wherein a cam surface is formed on the link member, wherein the switch comprises a follower element which engages the cam surface, wherein the cam surface and follower element together guide the movement of the link member to move the engagement element when the switch is actuated.

2. The collapsible carry cot of claim 1, wherein the second frame member is pivotally coupled to the body of the securing mechanism.

3. The collapsible carry cot of claim 1, wherein the engagement element is movable relative to the base member in a direction with a component in a lateral direction of the folding carry cot.

4. The collapsible carry cot of claim 1, wherein the base member comprises an opening to receive the engagement element at a position on the base member that is aligned with the engagement element when the first and second frame members are arranged such that a height of the side or end wall of the carry cot is at a maximum desirable height.

5. The collapsible carry cot of claim 1, wherein the cam surface is angled such that the action of the follower along the cam surface acts to move the link member in a direction that is angled relative to the direction in which the switch is actuated.

6. The collapsible carry cot of claim 1, wherein the switch is actuatable in a longitudinal direction of the carry cot.

7. The collapsible carry cot of claim 1, wherein the engagement element is biased into a configuration in which the engagement element engages the base member.

8. The collapsible carry cot of claim 7, wherein the securing portion further comprises a further engagement element to selectively engage the base member of the carry cot in order to secure the body of the securing mechanism relative to the base member, wherein the further engagement element is actuated independently of the engagement element to engage and disengage from the base member.

9. The collapsible carry cot of claim 8, wherein the securing portion further comprises a further switch to be actuated by a user and a further engagement mechanism for moving the further engagement element to disengage from and engage the base member when the further switched is actuated by the user.

10. The collapsible carry cot of claim 9, wherein the engagement mechanism and further engagement mechanism are is configured such that the switch and further switch are actuatable in the same direction as one another, in order to disengage the engagement element and further engagement element from the base member respectively.

* * * * *